United States Patent
Ray et al.

(10) Patent No.: US 11,275,193 B2
(45) Date of Patent: Mar. 15, 2022

(54) METHODS AND SYSTEMS FOR CALIBRATING DEPTH IN A WELL TO SEISMIC DATA IN A SUBSURFACE VOLUME OF INTEREST

(71) Applicant: Chevron U.S.A. Inc., San Ramon, CA (US)

(72) Inventors: Anandaroop Ray, Houston, TX (US);
Michael Greene, Houston, TX (US);
Mason Edwards, Houston, TX (US);
Reynaldo Cardona, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 748 days.

(21) Appl. No.: 16/227,944

(22) Filed: Dec. 20, 2018

(65) Prior Publication Data
US 2020/0200935 A1   Jun. 25, 2020

(51) Int. Cl.
*G01V 1/48*   (2006.01)
*G01V 13/00*   (2006.01)
*G01V 1/30*   (2006.01)
*G01V 1/28*   (2006.01)

(52) U.S. Cl.
CPC .................. *G01V 1/48* (2013.01); *G01V 1/28* (2013.01); *G01V 1/282* (2013.01); *G01V 1/306* (2013.01); *G01V 13/00* (2013.01); *G01V 2210/6222* (2013.01)

(58) Field of Classification Search
USPC .......................................................... 702/18
See application file for complete search history.

(56) References Cited

U.S. PATENT DOCUMENTS

| | | | |
|---|---|---|---|
| 5,691,958 A | 11/1997 | Calvert | |
| 7,082,367 B2 | 7/2006 | Bankhead | |
| 9,945,970 B1 | 4/2018 | Abel | |
| 2010/0149917 A1 | 6/2010 | Imhof | |
| 2011/0295510 A1 | 12/2011 | Gulati | |
| 2013/0185032 A1* | 7/2013 | Archer | G01V 1/42 703/2 |

(Continued)

FOREIGN PATENT DOCUMENTS

CN   105445802   3/2016

OTHER PUBLICATIONS

PCT International Search Report and Written Opinion, International Application No. PCT/US19/64921, dated Feb. 19, 2020 (10 pages).

*Primary Examiner* — Paul D Lee
(74) *Attorney, Agent, or Firm* — Esplin & Associates, PC

(57) ABSTRACT

Methods and systems for calibrating depth in a well to seismic data in a subsurface volume of interest are disclosed. Exemplary implementations may: obtain well data corresponding to the well in the subsurface volume of interest; convert the well data to converted well data; obtain a seismic trace and a corresponding wavelet; generate a transform model; apply the transform model to the converted well data to transform the converted well data into transformed well data; apply the corresponding wavelet to the transformed well data to generate a modified signal; generate a correspondence between the modified signal and the seismic trace; repeat one or more steps to select a given modified signal; and calibrate the well data to the seismic trace.

20 Claims, 5 Drawing Sheets

(56) References Cited

U.S. PATENT DOCUMENTS

| | | | |
|---|---|---|---|
| 2013/0289962 A1* | 10/2013 | Wendt | G01V 11/00 |
| | | | 703/10 |
| 2015/0168574 A1* | 6/2015 | Wallet | G01V 1/368 |
| | | | 367/53 |
| 2017/0192118 A1* | 7/2017 | Du | G01V 1/282 |
| 2017/0248716 A1 | 8/2017 | Poole | |
| 2019/0293822 A1 | 9/2019 | Li | |

* cited by examiner

METHODS AND SYSTEMS FOR CALIBRATING DEPTH IN A WELL TO SEISMIC DATA IN A SUBSURFACE VOLUME OF INTEREST

FIELD OF THE DISCLOSURE

The present disclosure relates to methods and systems for calibrating depth in a well to seismic data in a subsurface volume of interest.

BACKGROUND

Seismic well ties are an essential step in a seismic interpretation workflow to establish correspondence between reflectors in seismic time and logged well depth. Tying well depth to seismic time requires stretching, squeezing, and/or shifting logged wellbore seismic impedance so resulting synthetic seismic closely match the observed seismic data. Existing technologies use manual processes to tie well depth to seismic times.

SUMMARY

One aspect of the present disclosure relates to a method for calibrating depth in a well to seismic data in a subsurface volume of interest. The method may include obtaining, from the non-transient electronic storage, well data corresponding to the well in the subsurface volume of interest. The well data may specify depth values of the well in the subsurface volume of interest. The method may include converting, with the one or more physical computer processors, the well data to converted well data. The converted well data may specify time values corresponding to the well data. The method may include obtaining, from the non-transient electronic storage, a seismic trace, corresponding to the well in the subsurface volume of interest, and a corresponding wavelet. The seismic trace may specify time values as a function of energy. The method may include generating, with the one or more physical computer processors, a transform model based on one or more probabilities. The transform model may include a slope parameter and a shift parameter. The method may include applying, with the one or more physical computer processors, the transform model to the converted well data to transform the converted well data into transformed well data. The transformed well data may specify time values corresponding to the converted well data. The method may include applying, with the one or more physical computer processors, the corresponding wavelet to the transformed well data to generate a modified signal. The method may include generating, with the one or more physical computer processors, a correspondence between the modified signal and the seismic trace. The method may include repeating, with the one or more physical computer processors, one or more steps to select a given modified signal, based on the correspondence between individual ones of the modified signals and the seismic trace.

An aspect of the present disclosure relates to a system configured for calibrating depth in a well to seismic data in a subsurface volume of interest. The system may include one or more hardware processors configured by machine-readable instructions. The processor(s) may be configured to obtain, from the non-transient electronic storage, well data corresponding to the well in the subsurface volume of interest. The well data may specify depth values of the well in the subsurface volume of interest. The processor(s) may be configured to convert, with the one or more physical computer processors, the well data to converted well data. The converted well data may specify time values corresponding to the well data. The processor(s) may be configured to obtain, from the non-transient electronic storage, a seismic trace, corresponding to the well in the subsurface volume of interest, and a corresponding wavelet. The seismic trace may specify time values as a function of energy. The processor(s) may be configured to generate, from the non-transient electronic storage, a transform model based on one or more probabilities. The transform model may include a slope parameter and a shift parameter. The processor(s) may be configured to apply, with the one or more physical computer processors, the transform model to the converted well data to transform the converted well data into transformed well data. The transformed well data may specify time values corresponding to the converted well data. The processor(s) may be configured to apply, with the one or more physical computer processors, the corresponding wavelet to the transformed well data to generate a modified signal. The processor(s) may be configured to generating, with the one or more physical computer processors, a correspondence between the modified signal and the seismic trace. The processor(s) may be configured to repeat, with the one or more physical computer processors, one or more steps to select a given modified signal, based on the correspondence between individual ones of the modified signals and the seismic trace.

An aspect of the present disclosure relates to a non-transient computer-readable medium having instructions embodied thereon, the instructions being executable by one or more processors to perform a method for calibrating depth in a well to seismic data in a subsurface volume of interest. The method may include obtaining, from the non-transient electronic storage, well data corresponding to the well in the subsurface volume of interest. The well data may specify depth values of the well in the subsurface volume of interest. The method may include converting, with the one or more physical computer processors, the well data to converted well data. The converted well data may specify time values corresponding to the well data. The method may include obtaining, from the non-transient electronic storage, a seismic trace, corresponding to the well in the subsurface volume of interest, and a corresponding wavelet. The seismic trace may specify time values as a function of energy. The method may include generating, from the non-transient electronic storage, a transform model based on one or more probabilities. The transform model may include a slope parameter and a shift parameter. The method may include applying, with the one or more physical computer processors, the transform model to the converted well data to transform the converted well data into transformed well data. The transformed well data may specify time values corresponding to the converted well data. The method may include applying, with the one or more physical computer processors, the corresponding wavelet to the transformed well data to generate a modified signal. The method may include generating, with the one or more physical computer processors, a correspondence between the modified signal and the seismic trace. The method may include repeating, with the one or more physical computer processors, one or more steps to select a given modified signal, based on the correspondence between individual ones of the modified signals and the seismic trace.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the presently disclosed technology. As used in the specification and in the claims, the singular form of 'a', 'an', and 'the' include plural referents unless the context clearly dictates otherwise.

DETAILED DESCRIPTION

Disclosed are systems and methods for calibrating depth in a well to seismic data in a subsurface volume of interest. The disclosed technology may use an iterative probabilistic inverse process to simultaneously estimate the wavelet and tie wells, while staying within prior geological bounds. This method reduces the time required to generate a seismic-to-well-tie, quantifies a corresponding uncertainty, and refocuses time and energy on interpretation of the ties and its implications for seismic velocity and/or well log quality. The method may include converting well data into a time format. The method may include using a transform model, which may be generated based on one or more probabilities, to transform the converted well data into transformed well data that will be used for a synthetic seismic. The method may include estimating a seismic wavelet, and/or obtaining a seismic wavelet, to apply to the transformed well data to generate a synthetic seismic, or modified signal. The method may include repeating this multiple times and comparing different modified signals corresponding to different transform models to the seismic trace until a suitable match may be found. The method may, based on the matching sets of synthetic seismic data, tie the well data to the seismic data multiple times.

Figure 1:
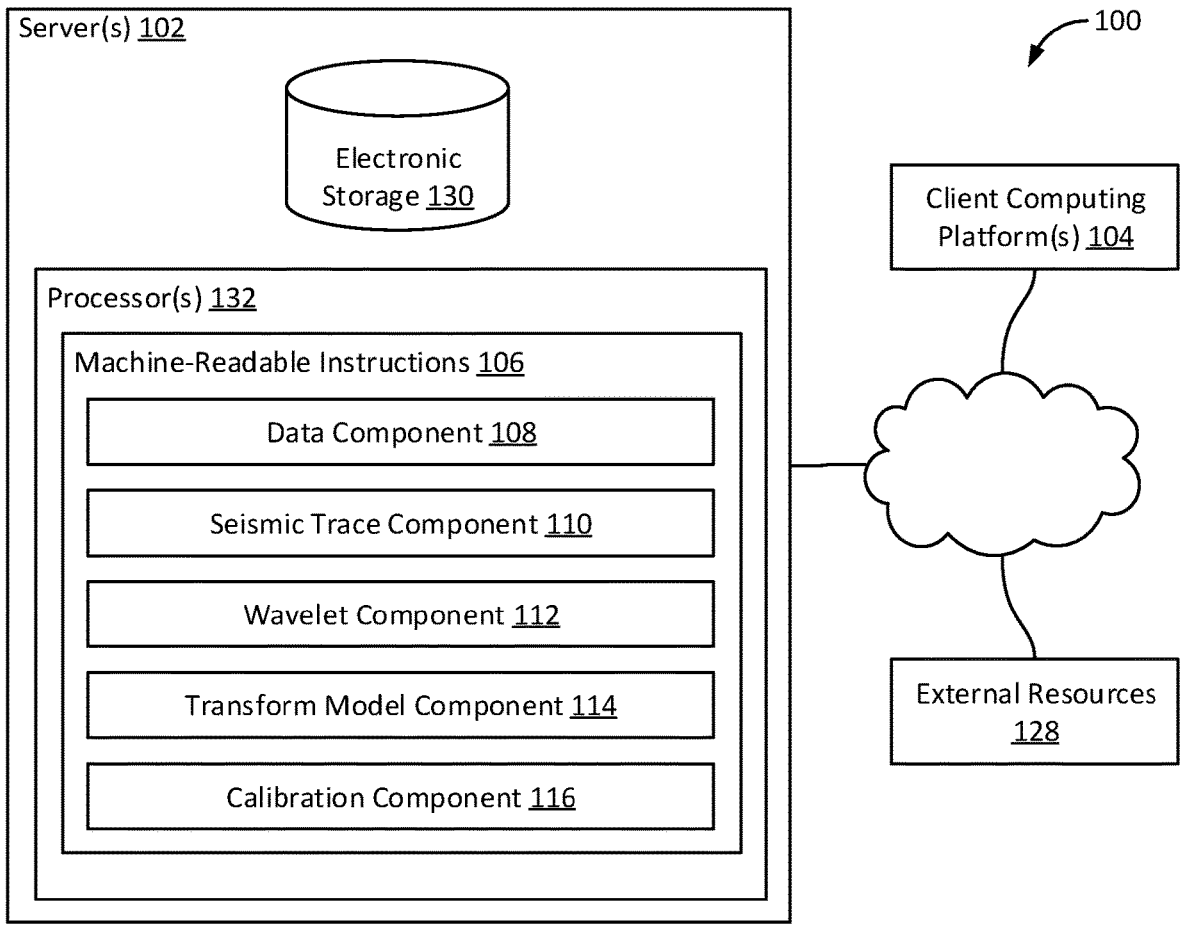
FIG. 1 illustrates a system configured for calibrating depth in a well to seismic data in a subsurface volume of interest, in accordance with one or more implementations.

FIG. 1 illustrates a system 100 configured for calibrating depth in a well to seismic data in a subsurface volume of interest, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of a data component 108, a transform model component 110, a seismic trace component 112, a wavelet component 114, a calibration component 116, and/or other instruction components.

Figures 3A, 3B:
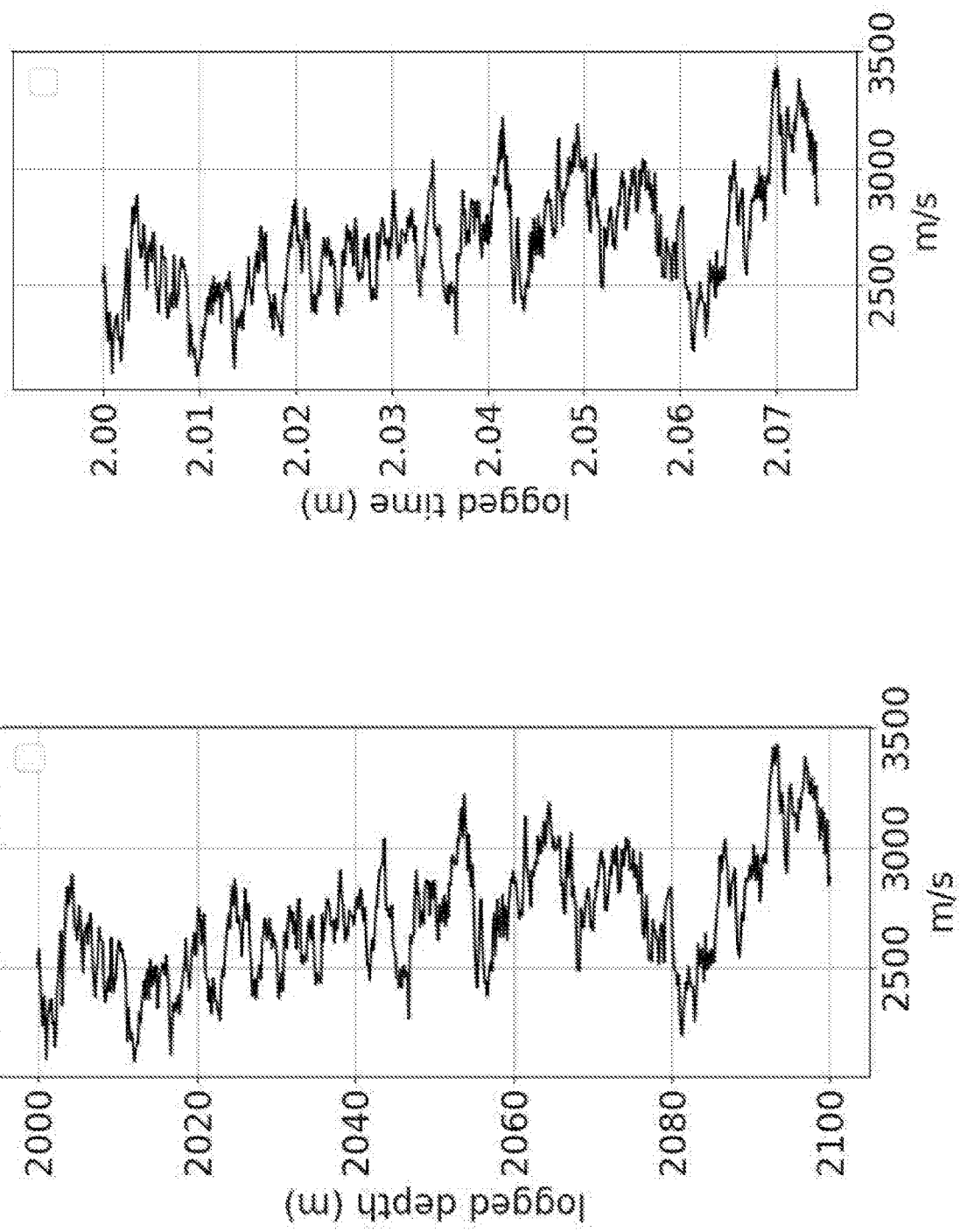
FIG. 3A illustrates well data, in accordance with one or more implementations.
FIG. 3B illustrates converted well data, in accordance with one or more implementations.

Data component 108 may be configured to obtain well data corresponding to the well in the subsurface volume of interest. The well data may specify depth values of the well in the subsurface volume of interest. A subsurface volume of interest may include any area, region, and/or volume underneath a surface. Such a volume may include, or be bounded by, one or more of a water surface, a ground surface, and/or other surfaces. The well may be a production wellbore, injection wellbore, and/or other wellbore. For example, FIG. 3A illustrates well data, in accordance with one or more implementations. As illustrated, original velocities are graphed along the x axis and corresponding depths are graphed on the y axis.

In implementations, data component 108 may be configured to convert the well data to converted well data. The converted well data may specify time values corresponding to the well data. Converting the well data to converted well data may include converting a top depth of the well to a corresponding time, $t_{top}$. Converting the well data to converted well data may include using the following equation $$t_n = t_{top} + 2 \sum_{i=0}^{N_t - 2} \frac{z_{i+2} - z_{i+1}}{v_{i+2}}$$

where $t_n$ may represent a given time value of the converted well data, $N_t$ may represent a total number of time values for the corresponding well data, $z_i$ may represent a given depth value, and $v_i$ may represent a given velocity value. It should be appreciated that other methods may be used to convert the well data into converted well data. The time values may represent the subsurface energy travelling from a source to a given depth in the well in the subsurface volume of interest to a receiver device. For example, checkshot velocities or seismic migration velocities may be used to determine $t_{top}$. Checkshot velocities may be a measure of the travel from the surface to a known depth in a well by lowering seismic sources into the well. Seismic migration velocities may include migrating and/or shifting seismic traces to account for multiple, different offsets.

For example, FIG. 3B illustrates converted well data, in accordance with one or more implementations. As illustrated, well data may be converted into time values, graphed on the y axis and velocities are plotted on the x axis.

Referring back to FIG. 1, seismic trace component 110 may be configured to obtain a seismic trace, corresponding to the well in the subsurface volume of interest, and a corresponding wavelet. The seismic trace may specify time values as a function of energy. The seismic trace may be subsurface data. The seismic trace may represent the subsurface energy travelling from a source to an interface in the subsurface volume of interest to a receiver device.

Wavelet component 112 may be configured to apply the corresponding wavelet to the transformed well data to generate a modified signal. Applying the corresponding wavelet may include convolving the transformed well data. Convolution may, for example, involve convolving computed Zoeppritz reflection coefficients, as will be described herein, with the corresponding wavelet. The convolution may generate the modified signal. The modified signal may be a synthetic seismic or trace. It should be appreciated that wavelet component 112 may be used multiple times to apply multiple corresponding wavelets to multiple sets of transformed well data to generate multiple modified signals.

Figure 5:
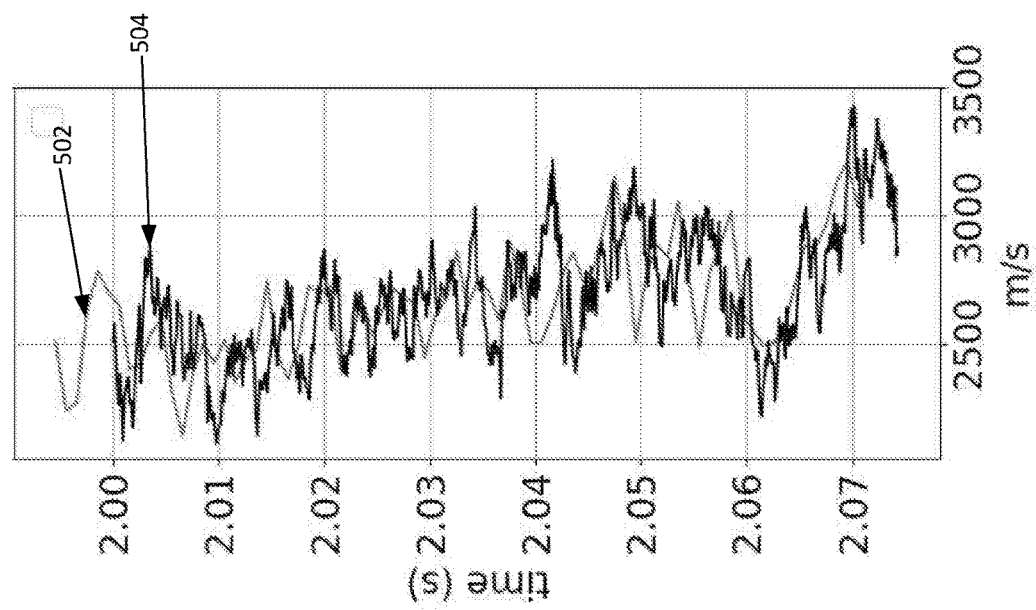
FIG. 5 illustrates example transformed well data and an example modified signal, in accordance with one or more implementations.

For example, FIG. 5 illustrates example transformed well data and an example modified signal, in accordance with one or more implementations. Applying the transform model to the converted well data generates transformed well data 502. Transformed well data 502 may be used to generate modified signal 504. Modified signal 504 may be compared to a seismic trace (not shown). If, for example, modified signal 504 is the closest match, based on a correspondence, modified signal 504 and corresponding data may be selected to tie the well to the seismic trace.

In implementations, wavelet component 112 may be configured to generate the corresponding wavelet to a seismic trace. The corresponding wavelet may be generated by using the seismic trace and a given reflectivity $g(m) \in \mathbb{R}^n$, where $\mathbb{R}$ may represent the set of all real numbers and m may represent the modified signal. Reflectivity may be the ratio of amplitude of the reflected subsurface energy to the source subsurface energy wave, or how much subsurface energy is reflected off a subsurface interface. This reflectivity may be based on the contrast in velocity and density across the subsurface interface. Using circular shifts of g, a Toeplitz circulant matrix may be generated: $g(m) \in \mathbb{R}^{n \times n}$. In combination with the Toeplitz circulant matrix, a zero phase wavelet $s \in \mathbb{R}^{2m}$ may be convolved to produce the seismic trace $d \in \mathbb{R}^n$, which may be defined as $G_m s_{pad} = d$, where 2m may be less than n. In matrix format, this may be represented by, in one example, $$\begin{bmatrix} g_1 & g_n & \cdots & g_3 & g_2 \\ g_2 & g_1 & \cdots & g_4 & g_3 \\ \vdots & \vdots & \ddots & \vdots & \vdots \\ g_{n-1} & g_{n-2} & \cdots & g_1 & g_n \\ g_n & g_{n-1} & \cdots & g_2 & g_1 \end{bmatrix} \begin{bmatrix} s_1 \\ \vdots \\ s_m \\ 0_{n-2m} \\ s'_m \\ \vdots \\ s'_1 \end{bmatrix} = \begin{bmatrix} d_1 \\ \vdots \\ d_{m+1} \\ \vdots \\ d_{n-m} \\ \vdots \\ d_n \end{bmatrix}$$

The matrix may be refined and columns corresponding to the n−2m rows of zero padding may be removed, generating $\widetilde{G_m} s = d$. In implementations, a (n−2m)×2m system $\widetilde{\widetilde{G_m}} s = \widetilde{\widetilde{d}}$. In implementations, the one or more reflectivities, g(m), may be calculated and the corresponding wavelet may be estimated using, for example, a least squares estimate $$\hat{s} = (\widetilde{G}^t \widetilde{G})^{-1} \widetilde{G}^t \widetilde{d}$$

A Fourier transform may be applied to the least squares estimate of the corresponding wavelet, resulting in $$\hat{s} = \mathcal{F}^{-1}(|\mathcal{F}(\widetilde{G}^{-1}\widetilde{d})|)$$

where $\hat{s}$ may represent the corresponding wavelet, $\mathcal{F}$ may represent a Fourier transform, $\widetilde{G}$ may represent the modified matrix of the one or more reflectivities, and $\widetilde{d}$ may represent the seismic trace. In some implementations, the least squares estimate of the corresponding wavelet may be used with a singular value decomposition pseudoinverse that may discard singular values below $10^{-8}$. The resulting matrix may be used for the Fourier transformed least squares estimate to generate the corresponding wavelet. It should be appreciated that different methods may be used to achieve maximum energy values concentrated near a time (e.g., about 0).

Transform model component 114 may be configured to generate a transform model based on one or more probabilities. The transform model may include a slope parameter and a shift parameter. The transform model may be based, in part, on an inversion, a Markov chain Monte Carlo sampling process, and/or other techniques. For example, the transform model may include one or more parameters to stretch and/or squeeze data, shift the data, and/or otherwise modify the data. One example of a transform model may be $$t'_{j,i} = t'_{j-1} + l_j(l_{j,i} - t_{j-1})$$

where t' may represent transformed time (e.g., transformed well data specifying time values corresponding to the converted well data), t may represent a target time (e.g., converted well data specifying time values corresponding to the well data), and l may represent a slope. In implementations, the new curve t' may be specified by one or more piecewise linear sections. For example, FIG. 4A illustrates example model parameterizations, in accordance with one or more implementations. As illustrated, an original parameterization may be graphed as line 402. A transformed parameterization may be graphed as line 404 with three slopes, two pinch points and a bulk shift.

Figure 4B:
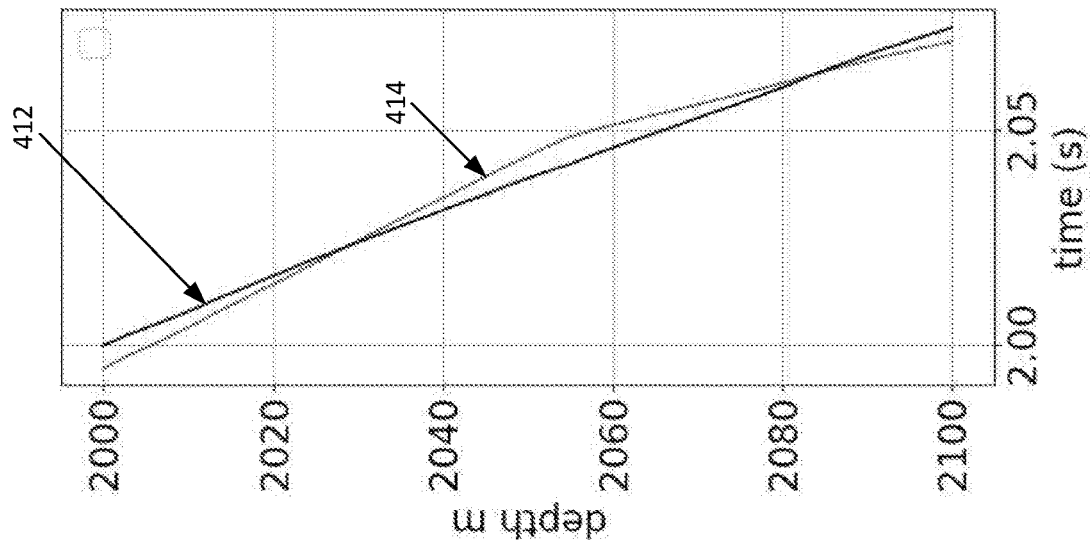
FIG. 4B illustrates example transform models, in accordance with one or more implementations s.
Figure 4A:
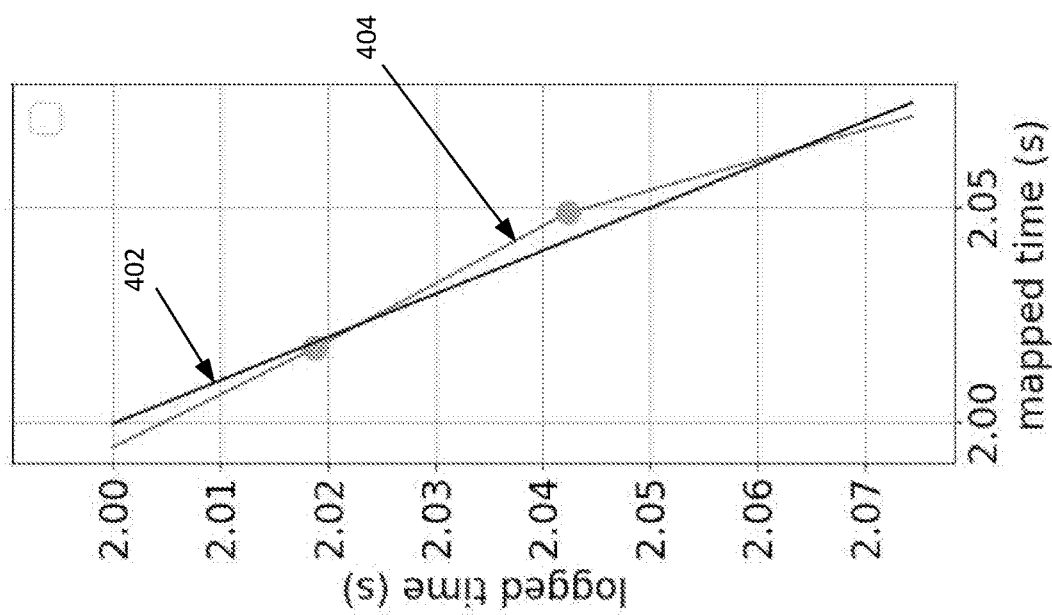
FIG. 4A illustrates example model parameterizations, in accordance with one or more implementations.

FIG. 4B illustrates example transform models, in accordance with one or more implementations. Depth-time curve 412 corresponds to line 402 and depth-time curve 414 corresponds to line 404. Depth-time curve 404 may be the well-tying curve, if, for example, the modified signal is selected as a suitable match for the seismic trace.

Referring back to transform model component 114, in implementations, the transform model may include linearly interpolating log velocities at a time (e.g., about 1 ms). It should be appreciated that other times may be used for different applications. Log velocities may be obtained from compressional velocities, density, and/or shear speed at time t' that may be the original logged velocities at the corresponding depth z. Based on the equation, $$\frac{dt'}{dt} = l$$

v' can be derived:

$$v' = \frac{dz}{dt'}$$
$$= \frac{1}{l}\frac{dz}{dt'}$$
$$v' = \frac{1}{l}v$$

The transform model may include zero-phase low pass filtering interpolated log velocities at a frequency (e.g., about 100 Hz). It should be appreciated that different frequencies and/or other filtering techniques may be used for different applications. The transform model may include decimating filtered log velocities at a time (e.g., about 4 ms).

It should be appreciated that different time values may be used to decimate the filtered log velocities for different applications.

In some implementations, one of the one or more probabilities used to generate the transform model may be based on, for example, $$\alpha(m \to m') = \min\left[1, \frac{p(m')}{p(m)} \frac{q(m|m')}{q(m'|m)} \frac{\mathcal{L}(m')}{\mathcal{L}(m)} |J|\right]$$

where m represents an initial transform model, m' represents the transform model, p( ) represents a prior model probability for a given variable, q( ) represents a proposal probability from a first variable to a second variable, $\mathcal{L}$ represents a likelihood for a given transform model, and |J| represents a determinant of a Jacobian of a transformation of variables while changing a number of slopes from the first transform model to the second transform model. In some implementations, a threshold probability value may be used to select a transform model from the multiple possible transform models.

A prior model probability may be defined by, for example, $$p(m) = \frac{1}{\Delta t_{top}} \frac{1}{\Delta l^{k+1}} \frac{k!}{\prod_{i=1}^{k}(N-i+1)} p(k)$$

for $k = 0, 1, \ldots, k_{max}$ where $t_{top}$ may represent a time corresponding to a top of the multiple depth values, l may represent a linear slope, k may represent a number of the time values in the converted well data, i may represent a given point to modify, N may represent a number of locations in the time values in the converted well data (e.g., N may include the number of points where a point can be added, which may not include a start point and an end point) and p( ) may represent a probability for a given variable. In implementations, the transform model may need a fixed value for a symmetric perturbation of $t_{top}$. For example, 5% of $\Delta t_{top}$ may be used, based on a Gaussian proposal. It should be appreciated that other values may be used in different applications.

In implementations, $$\frac{p(m')}{p(m)} = \frac{k+1}{\Delta l} \frac{1}{N-k} \frac{p(k+1)}{p(k)}$$

and $$\frac{q(m|m')}{q(m'|m)} = \frac{\Delta l(N-k)}{k+1}$$

may be used for the insertion of a given point between one or more slopes in the converted well data (e.g., where k' may equal k+1). The variables may use the same definitions as described above.

In implementations, $$\frac{p(m')}{p(m)} = \frac{\Delta l}{k} \frac{1}{N-k+1} \frac{p(k+1)}{p(k)}$$

and $$\frac{q(m|m')}{q(m'|m)} = \frac{k}{\Delta l(N-k+1)}$$

may be used for the deletion of the given point between the one or more slopes in the converted well data (e.g., where k' may equal k−1). The variables may use the same definitions as described above.

A likelihood for the given transform model may be defined by $$\mathcal{L}(m) = \exp(-\tfrac{1}{2}[f(m)-d]^t C_d^{-1}[f(m)-d])$$

where f(m) is a resulting trace, d may represent the actual seismic trace, t may represent a time value, such as, for example, converted well data, and $C_d$ may represent a covariance matrix between the noise in the data samples in the seismic trace. This may be a diagonal matrix, with diagonal entries providing an estimate of noise variance at corresponding time samples. Higher variance corresponds to lower signal to noise ratio.

In some implementations, the likelihood for the given transform model may be approximated by $$\mathcal{L}(m) \propto (r^t r)^{-\frac{Q}{2}}$$

where r may represent a residual defined by r=[f(m)−d], t may represent a time value, and Q may represent the number of converted well data. In some implementations, Q may be selected based on a minimum number of samples available to any transform model. Q may be generated using converted well data. As discussed above, f(m) may represent a modified signal, and d may represent the seismic trace. The approximate likelihood equation may be used, for example, when data noise may be unknown.

With respect to the probability equation above, a Jacobian may be a matrix of first-order partial derivatives of a vector-valued function.

In implementations, one of the one or more probabilities used to accept the transform model may be based on, for example, $$\alpha(m \to m') = \min\left[1, \beta\frac{\mathcal{L}(m')}{\mathcal{L}(m)}\right]$$

where m may represents an initial transform model, m' may represent the transform model, β may represent a modification parameter, and $\mathcal{L}$ may represent a likelihood for the transform model. In implementations, the example transform model equation above may be the likelihood ratio. For example, when p(k) may be constant for k=0, ..., $k_{max}$, p(k) may be the likelihood ratio.

β, the modification parameter, may include one or more scalar values corresponding to one or more of an insertion of a given point between the one or more slopes in the converted well data, a deletion of the given point between the one or more slopes in the converted well data, a movement of the given point between the one or more slopes in the converted well data, a time shift of the converted well data, and/or other modifications to the converted well data. For example, the modification parameter may be defined by $$\beta_{insertion} = \frac{p(k+1)}{p(k)}$$

for an insertion of the given point between the one or more slopes in the converted well data. In some implementations, p(k) may equal $$\frac{1}{k}.$$

In one example, the modification parameter may be defined by $$\beta_{deletion} = \frac{p(k-1)}{p(k)}$$

for an insertion of the given point between the one or more slopes in the converted well data. In some implementations, p(k) may equal $$\frac{1}{k}.$$

In implementations, transform model component 114 may be configured to apply the transform model to the converted well data to transform the converted well data into transformed well data. The transformed well data may specify time values corresponding to the converted well data. It should be appreciated that transform model component 114 may be used multiple times to apply multiple transform models to the converted well data to transform the converted well data into multiple sets of transformed well data.

Calibration component 116 may be configured to generate a correspondence between the modified signal and the seismic trace. The correspondence may be a difference between the given modified signal and the seismic trace. For example, the difference may be a mathematical difference between the modified signal and the seismic trace. It should be appreciated that calibration component 116 may be used multiple times to generate multiple correspondences between multiple modified signals and the seismic trace.

In implementations, calibration component 116 may be configured to select a given modified signal based on the correspondence between individual ones of the modified signals and the seismic trace. The given modified signal may be selected because the difference between the given modified signal and the seismic trace is the smallest compared to other modified signals. It should be appreciated that other factors may contribute to selecting the given modified signal, such as, for example, a highest probability based on the one or more probabilities, a corresponding likelihood, etc.

In implementations, calibration component 116 may be configured to calibrate the well data to the seismic trace based on a selected transformed well data corresponding to a selected modified signal.

In some implementations, calibration component 116 may be configured to generate an uncertainty estimate for calibrating the well data to the seismic trace based on the multiple modified signals. Given that multiple transform models may be used to generate the multiple modified signals, uncertainty on the well ties may be generated based on the multiple, different properties corresponding to the multiple transform models.

In some implementations, server(s) 102, client computing platform(s) 104, and/or external resources 128 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 128 may be operatively linked via some other communication media.

A given client computing platform 104 may include one or more processors configured to execute computer program components. The computer program components may be configured to enable an expert or user associated with the given client computing platform 104 to interface with system 100 and/or external resources 128, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 128 may include sources of information outside of system 100, external entities participating with system 100, and/or other resources. In some implementations, some or all of the functionality attributed herein to external resources 128 may be provided by resources included in system 100.

Server(s) 102 may include electronic storage 130, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may include non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), non-transient electronic storage, and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a physical computer processor, a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, and/or 116, and/or other components. Processor(s) 132 may be configured to execute components 108, 110, 112, 114, and/or 116, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 116 are illustrated in FIG. 1 as being implemented within a single processing unit, in implementations in which processor(s) 132 includes multiple processing units, one or more of components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As one example, processor(s) 132 may be configured to execute one or more additional components that may perform some or all of the functionality attributed below to one of components 108, 110, 112, 114, and/or 116.

Figure 2:
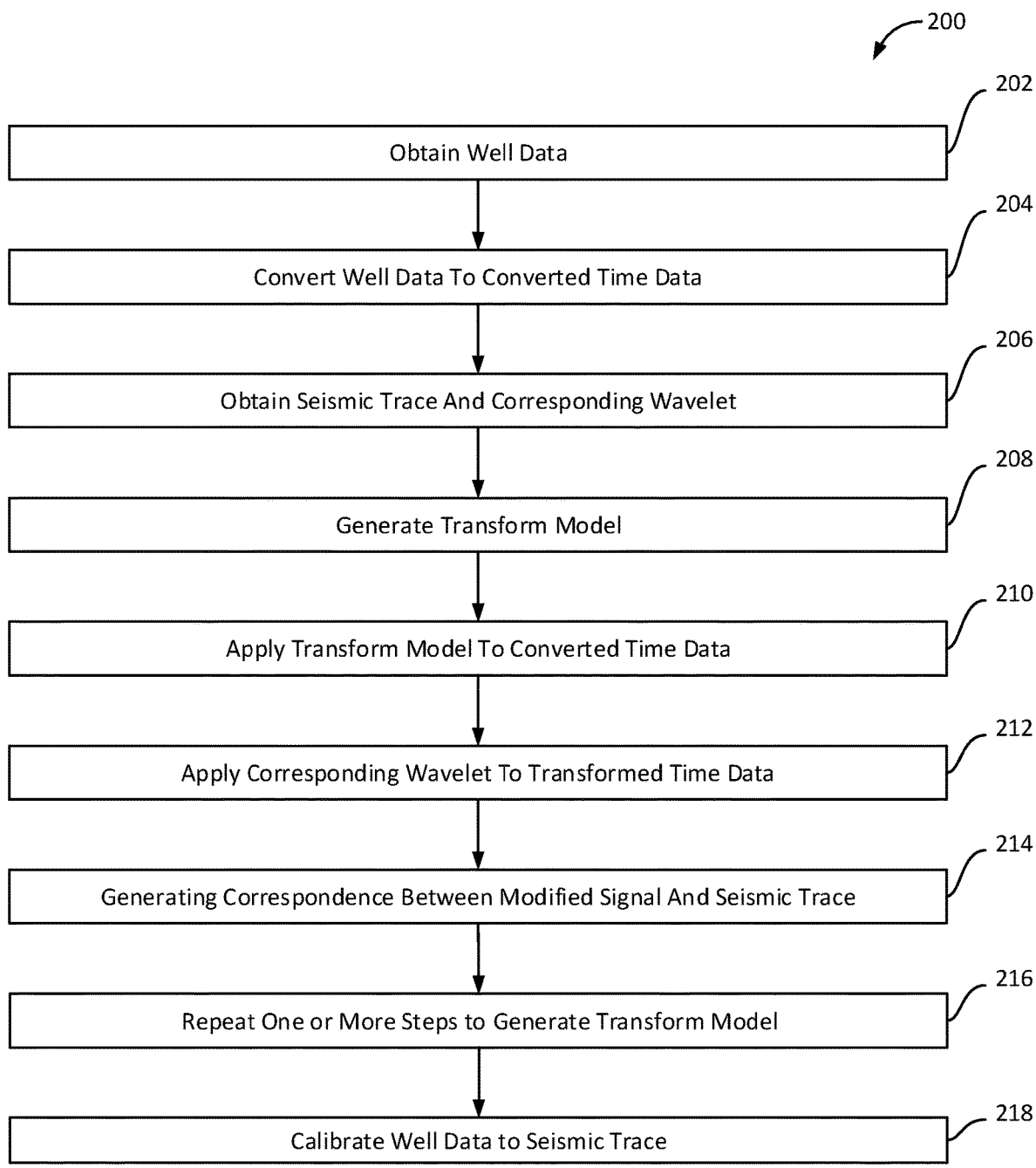
FIG. 2 illustrates a method for calibrating depth in a well to seismic data in a subsurface volume of interest, in accordance with one or more implementations.

FIG. 2 illustrates a method 200 for calibrating depth in a well to seismic data in a subsurface volume of interest, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a physical computer processor, a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium, such as, for example, non-transient electronic storage. The one or more processing devices may include one or more devices configured through hardware, firmware, and/or software to be specifically designed for execution of one or more of the operations of method 200.

An operation 202 may include obtaining well data corresponding to the well in the subsurface volume of interest. The well data may specify depth values of the well in the subsurface volume of interest. Operation 202 may be performed by one or more processors configured by machine-readable instructions including a component that is the same as or similar to data component 108, in accordance with one or more implementations.

An operation 204 may include converting the well data to converted well data. In some implementations, converting the well data to converted well data may include converting a top depth of the well to a corresponding time, $t_{top}$ and generating the converted well data using $$t_n = t_{top} + 2\sum_{i=0}^{N_t-2} \frac{z_{i+2} - z_{i+1}}{v_{i+2}},$$

as described in greater detail above. Operation 204 may be performed by one or more processors configured by machine-readable instructions including a component that is the same as or similar to data component 108, in accordance with one or more implementations.

An operation 206 may include obtaining a seismic trace, corresponding to the well in the subsurface volume of interest, and a corresponding wavelet. The seismic trace may specify time values as a function of energy. In implementations, the corresponding wavelet may be generated by using the seismic trace. For example, the corresponding wavelet may be defined by $$\hat{s} = \mathcal{F}^{-1}(|\mathcal{F}(\tilde{G}^{-1}\tilde{d})|)$$

as described in greater detail above. Operation 206 may be performed by one or more processors configured by machine-readable instructions including a component that is the same as or similar to seismic trace component 110, in accordance with one or more implementations.

An operation 208 may include generating a transform model based on one or more probabilities. The transform model may include a slope parameter and a shift parameter. The one or more probabilities may include $$\alpha(m \to m') = \min\left[1, \frac{p(m')}{p(m)} \frac{q(m|m')}{q(m'|m)} \frac{\mathcal{L}(m')}{\mathcal{L}(m)} |J|\right],$$

as described in more detail above, $$\alpha(m \to m') = \min\left[1, \beta \frac{\mathcal{L}(m')}{\mathcal{L}(m)}\right],$$

described in more detail above, and $$p(m) = \frac{1}{\Delta t_{top}} \frac{1}{\Delta l^{k+1}} \frac{k!}{\prod_{i=1}^{k}(N-i+1)} p(k)$$

for $k = 0, 1, \ldots, k_{max}$, described in more detail above. The modification parameter, β, may have one or more scalar values corresponding to one or more of an insertion of a slope in the converted well data, a deletion of the slope in the converted well data, a movement of the slope in the converted well data, a time shift of the converted well data, and/or other modifications. Example equations for the modification parameter, β, are described in greater detail above. Operation 208 may be performed by one or more processors configured by machine-readable instructions including a component that is the same as or similar to transform model component 114, in accordance with one or more implementations.

An operation 210 may include applying the transform model to the converted well data to transform the converted well data into transformed well data. The transformed well data may specify time values corresponding to the converted well data. Example transform models may be described in greater detail above. Operation 210 may be performed by one or more processors configured by machine-readable instructions including a component that is the same as or similar to data component 108, in accordance with one or more implementations.

An operation 212 may include applying the corresponding wavelet to the transformed well data to generate a modified signal. Operation 212 may be performed by one or more processors configured by machine-readable instructions including a component that is the same as or similar to wavelet component 112, in accordance with one or more implementations.

An operation 214 may include generating a correspondence between the modified signal and the seismic trace. The correspondence may be a difference between the given modified signal and the seismic trace. Operation 214 may be performed by one or more processors configured by machine-readable instructions including a component that is the same as or similar to calibration component 116, in accordance with one or more implementations.

An operation 216 may include repeating 208-214 to select a given modified signal, based on the correspondence between individual ones of the modified signals and the seismic trace. Operation 216 may be performed by one or more processors configured by machine-readable instructions including a component that is the same as or similar to calibration component 116, in accordance with one or more implementations.

An operation 218 may include calibrating the well data to the seismic trace based on a selected transformed well data corresponding to a selected modified signal. The calibration may include an uncertainty estimate based on the multiple modified signals. Operation 218 may be performed by one or more processors configured by machine-readable instructions including a component that is the same as or similar to calibration component 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A computer-implemented method for calibrating depth in a well to seismic data in a subsurface volume of interest, the method being implemented in a computer system that includes one or more physical computer processors and non-transient electronic storage, comprising:
    a) obtaining, from the non-transient electronic storage, well data corresponding to the well in the subsurface volume of interest, wherein the well data specifies depth values of the well in the subsurface volume of interest;
    b) converting, with the one or more physical computer processors, the well data to converted well data, wherein the converted well data specifies time values corresponding to the well data;
    c) obtaining, from the non-transient electronic storage, a seismic trace, corresponding to the well in the subsurface volume of interest, and a corresponding wavelet, wherein the seismic trace specifies time values as a function of energy;
    d) generating, with the one or more physical computer processors, a transform model based on one or more probabilities, wherein the transform model includes a slope parameter and a shift parameter;
    e) applying, with the one or more physical computer processors, the transform model to the converted well data to transform the converted well data into transformed well data, wherein the transformed well data specifies time values corresponding to the converted well data;
    f) applying, with the one or more physical computer processors, the corresponding wavelet to the transformed well data to generate a modified signal;
    g) generating, with the one or more physical computer processors, a correspondence between the modified signal and the seismic trace; and
    h) repeating, with the one or more physical computer processors, steps d)-g) to select a given modified signal, based on the correspondence between individual ones of the modified signals and the seismic trace.

2. The computer-implemented method of claim 1, further comprising:
    calibrating, with the one or more physical computer processors, the well data to the seismic trace based on a selected set of transformed well data corresponding to a selected modified signal.

3. The computer-implemented method of claim 2, further comprising:
    generating, with the one or more physical computer processors, an uncertainty estimate for calibrating the well data to the seismic trace based on the multiple modified signals.

4. The computer-implemented method of claim 1, wherein the correspondence is a difference between the given modified signal and the seismic trace.

5. The computer-implemented method of claim 1, where the corresponding wavelet, is generated by using the seismic trace.

6. The computer-implemented method of claim 1, wherein the corresponding wavelet, $\hat{s}$, is generated by using the converted well data, such that $$\hat{s} = \mathcal{F}^{-1}(|\mathcal{F}(\tilde{\tilde{G}}^{-1}\tilde{\tilde{d}})|)$$

where $\mathcal{F}$ represents a Fourier transform, $\tilde{\tilde{G}}$ represents a reflectivity matrix excluding columns corresponding to the one or more (n−2m)×2m rows, and $\tilde{\tilde{d}}$ represents the seismic trace.

7. The computer-implemented method of claim 1, wherein one of the one or more probabilities used to generate a second transform model, m', is based on a probability, α:

$$\alpha(m \to m') = \min\left[1, \frac{p(m')}{p(m)} \frac{q(m|m')}{q(m'|m)} \frac{\mathcal{L}(m')}{\mathcal{L}(m)} |J|\right]$$

where m represents a first transform model, p( ) represents a prior model probability for a given variable, q( ) represents a proposal probability from a first variable to a second variable, $\mathcal{L}$ represents a likelihood for a given transform model, and J represents a determinant of a Jacobian of a transformation of variables while changing a number of slopes from the first transform model to the second transform model.

8. The computer-implemented method of claim 1, wherein one of the one or more probabilities used to generate a second transform model, m', is based on a probability, α:

$$\alpha(m \to m') = \min\left[1, \beta \frac{\mathcal{L}(m')}{\mathcal{L}(m)}\right]$$

where m represents a first transform model, β represents a modification parameter, and $\mathcal{L}$ represents a likelihood for a given transform model.

9. The computer-implemented method of claim 8, wherein the modification parameter, β, has scalar values corresponding to one or more of an insertion of a slope in the converted well data, a deletion of the slope in the converted well data, a movement of the slope in the converted well data, and a time shift of the converted well data.

10. The computer-implemented method of claim 9, wherein the modification parameter, β, for the insertion of a point between slopes is $$\beta_{insertion} = \frac{p(k+1)}{p(k)}$$

where ρ is a probability of a variable and k+1 represents a number of slopes in the transform model with k points.

11. The computer-implemented method of claim 9, wherein the modification parameter, β, for the deletion of a point between slopes is $$\beta_{deletion} = \frac{p(k+1)}{p(k)}$$

where ρ is a probability of a variable and k+1 represents the number of slopes in the transform model with k points.

12. The computer-implemented method of claim 9, wherein the modification parameter, β, for the movement of a point between slopes or a time shift of the well data (in time) is equal to 1.

13. The computer-implemented method of claim 1, wherein one of the one or more probabilities used to generate a given transform model, m, is:

$$p(m) = \frac{1}{\Delta t_{top}} \frac{1}{\Delta l^{k+1}} \frac{k!}{\prod_{i=1}^{k}(N-i+1)} p(k)$$

for $k = 0, 1, \ldots, k_{max}$ where $t_{top}$ represents a time corresponding to a top of the multiple depth values, l represents a linear slope, k represents a number of the time values in the converted well data, i represents a given point to modify, N represents a number of locations in the time values in the converted well data, and p( ) represents a probability for a given variable.

14. The computer-implemented method of claim 1, wherein converting the multiple depth values of the well data to time values comprises:

converting a top depth of the well to a corresponding time, $t_{top}$; and generating the converted well data using $$t_n = t_{top} + 2\sum_{i=0}^{N_t-2} \frac{z_{i+2} - z_{i+1}}{v_{i+2}},$$

where $t_n$ is a given time value of the converted well data, $N_t$ represents a total number of time values, z represents a depth value, and v represents a velocity value.

15. A system for calibrating depth in a well to seismic data in a subsurface volume of interest, the system comprising:

non-transient electronic storage; and one or more physical computer processors configured by machine-readable instructions to:

a) obtain, from the non-transient electronic storage, well data corresponding to the well in the subsurface volume of interest, wherein the well data specifies depth values of the well in the subsurface volume of interest;

b) convert, with the one or more physical computer processors, the well data to converted well data, wherein the converted well data specifies time values corresponding to the well data;

c) obtain, from the non-transient electronic storage, a seismic trace, corresponding to the well in the subsurface volume of interest, and a corresponding wavelet, wherein the seismic trace specifies time values as a function of energy;

d) generate, with the one or more physical computer processors, a transform model based on one or more probabilities, wherein the transform model includes a slope parameter and a shift parameter;

e) apply, with the one or more physical computer processors, the transform model to the converted well data to transform the converted well data into transformed well data, wherein the transformed well data specifies time values corresponding to the converted well data;

f) apply, with the one or more physical computer processors, the corresponding wavelet to the transformed well data to generate a modified signal;

g) generate, with the one or more physical computer processors, a correspondence between the modified signal and the seismic trace; and h) repeating, with the one or more physical computer processors, steps d)-g) to select a given modified signal, based on the correspondence between individual ones of the modified signals and the seismic trace.

16. The system of claim 15, wherein the one or more physical computer processors are further configured by machine-readable instructions to:

calibrate, with the one or more physical computer processors, the well data to the seismic trace based on a selected set of transformed well data corresponding to a selected modified signal.

17. The system of claim 15, wherein the corresponding wavelet, $\hat{s}$, is generated by using the converted well data, such that $$\hat{s} = \mathcal{F}^{-1}(|\mathcal{F}(\tilde{\tilde{G}}^{-1}\tilde{\tilde{d}})|)$$

where $\mathcal{F}$ represents a Fourier transform, $\tilde{\tilde{G}}$ represents a reflectivity matrix excluding columns corresponding to the one or more (n−2m)×2m rows, and $\tilde{\tilde{d}}$ represents the seismic trace.

18. A non-transitory computer-readable medium storing instructions for calibrating depth in a well to seismic data in a subsurface volume of interest, the instructions configured to, when executed:

a) obtain, from non-transient electronic storage, well data corresponding to the well in the subsurface volume of interest, wherein the well data specifies depth values of the well in the subsurface volume of interest;

b) convert, with one or more physical computer processors, the well data to converted well data, wherein the converted well data specifies time values corresponding to the well data;

c) obtain, from the non-transient electronic storage, a seismic trace, corresponding to the well in the subsurface volume of interest, and a corresponding wavelet, wherein the seismic trace specifies time values as a function of energy;

d) generate, with the one or more physical computer processors, a transform model based on one or more probabilities, wherein the transform model includes a slope parameter and a shift parameter;

e) apply, with the one or more physical computer processors, the transform model to the converted well data to transform the converted well data into transformed well data, wherein the transformed well data specifies time values corresponding to the converted well data;

f) apply, with the one or more physical computer processors, the corresponding wavelet to the transformed well data to generate a modified signal;

g) generate, with the one or more physical computer processors, a correspondence between the modified signal and the seismic trace; and h) repeating, with the one or more physical computer processors, steps d)-g) to select a given modified signal, based on the correspondence between individual ones of the modified signals and the seismic trace.

19. The non-transitory computer-readable medium of claim 18, wherein the instructions are further configured to:

calibrate, with the one or more physical computer processors, the well data to the seismic trace based on a selected set of transformed well data corresponding to a selected modified signal.

20. The non-transitory computer-readable medium of claim 18, wherein the corresponding wavelet, $\hat{s}$, is generated by using the converted well data, such that $$\hat{s} = \mathcal{F}^{-1}(|\mathcal{F}(\tilde{\tilde{G}}^{-1}\tilde{\tilde{d}})|)$$

where $\mathcal{F}$ represents a Fourier transform, $\tilde{\tilde{G}}$ represents a reflectivity matrix excluding columns corresponding to the one or more (n−2m)×2m rows, and $\tilde{\tilde{d}}$ represents the seismic trace.

* * * * *